3,839,559
ANTICOCCIDIAL METHOD
Robert L. Hamill, New Ross, and Marvin M. Hoehn, Indianapolis, Ind., assignors to Eli Lilly and Company, Indianapolis, Ind.
Continuation-in-part of application Ser. No. 211,231, Dec. 23, 1971. This application July 16, 1973, Ser. No. 379,896
Int. Cl. A61k 21/00
U.S. Cl. 424—121
6 Claims

ABSTRACT OF THE DISCLOSURE

Methods and compositions for the control of coccidiosis using antibiotics A28695A and A28695B, or the mixture thereof, identified as A28695, and their physiologically-acceptable salts as the active anticoccidial agent.

CROSS-REFERENCE

Figure 1:
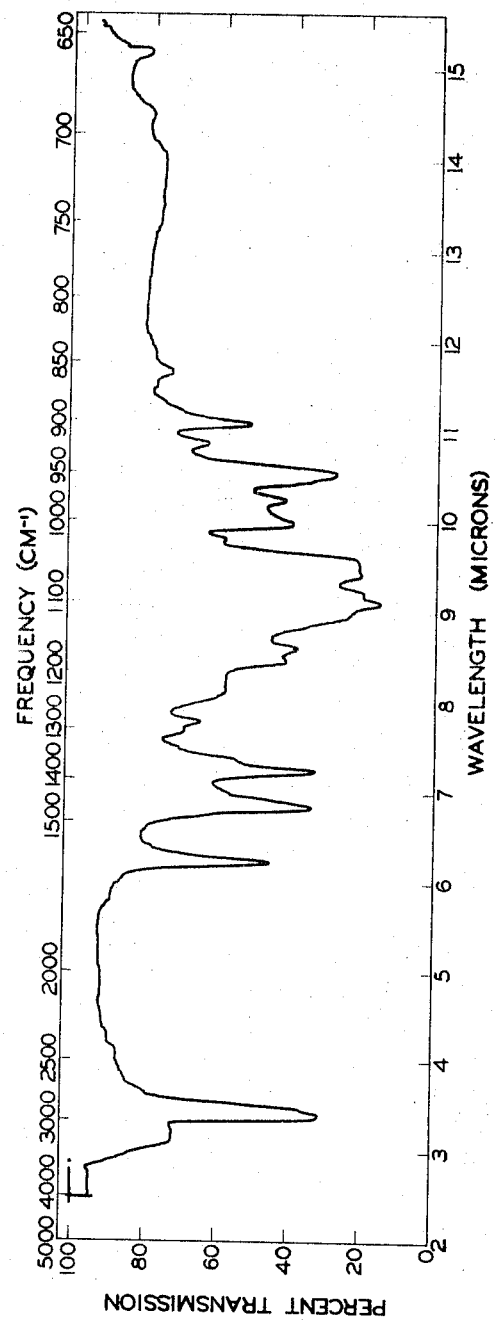

This application is a continuation-in-part of copending application Ser. No. 211,231, filed Dec. 23, 1971.

BACKGROUND OF THE INVENTION

1. Field of the Invention

Coccidiosis is a common and widespread poultry disease caused by one or more of several species of protozoan parasites of the genus Eimeria such as E. tenella, E. necatrix, E. acervulina, E. maxima, E. brunetti, E. mivati, E. adenoeides, and E. meleagrimitis. E. tenella is the causative agent of severe and often fatal infection of the caeca of chickens, which is manifested by severe and extensive hemorrhage, accumulation of blood in the caeca, and the passage of blood in the droppings. E. necatrix attacks the small intestine of the chick causing intestinal coccidiosis. E. meleagrimitis and E. adenoeides are causative organisms of coccidiosis in turkeys.

In rabbits (Oryctolagus cuniculus), coccidiosis is caused by one or more of the following species of the genus Eimeria. Thus, E. stiedae attacks the liver, while E. coecicola, E. intestinalis, E. irresidua, E. media, E. magna, E. perforans, E. piriformis, and E. neoleporis, all occur in some portion of the intestinal tract of the rabbit.

When left untreated, the severe infections of coccidiosis lead to poor weight gain, reduced feed efficiency and high mortality in fowl or rabbits. The morbidity and mortality occasioned by coccidiosis infections create extensive economic loss when such infections are left untreated or unchecked. The elimination or control of this disease is, therefore, of paramount importance to the poultry and rabbit raising industry.

2. Description of the Prior Art

In the prior art, Gorman et al., U.S. 3,55,150 (Jan. 12, 1971) teach the use of the antibiotic nigericin, its alkali metal, alkaline earth, and basic nitrogen salts for the prevention and treatment of coccidiosis in poultry, including chickens and turkeys.

Further, Gorman et al., U.S. 3,577,531 (May 4, 1971) teach the use of the antibiotic dianemycin and its alkali metal, alkaline earth, and basic nitrogen salts in the prevention and treatment of coccidiosis in chickens and turkeys.

In addition, Gorman et al., U.S. Pat. 3,627,883 (Dec. 14, 1971) teach the use of antibiotic X–206, its alkali metal, alkaline earth metal, or basic nitrogen salts as potent poultry coccidiostats.

Bloss, U.S. Pat. 3,482,023 (Dec. 2, 1969), teaches the use of dihydroacetinospectacin for the control of coccidiosis in meat-producing animals.

Also in the prior art, Fitzgerald, J. Protozool 19 (2) 332–334 (1972) discusses the efficacy of the antibiotic monensin in the treatment of hepatic coccidiosis in rabbits.

Further in the prior art is Haney et al., U.S. Pat. 3,501,- 568 (Mar. 17, 1970), with claims to the antibiotic A3823, also known as monensin, and which patent teaches the use of antibiotic A3823 complex to prevent the development of coccidiosis in poultry.

Berger, Ger. Offen. 2,140,322 (Feb. 17, 1972), teaches the antibiotic X–5108 and its activity against gram-negative and gram-positive bacteria, as well as activity against streptococci, penumococci, and caecal coccidiosis.

Also in the prior art, Kubota et al., Japanese 72 01,288 (Jan. 13, 1972), teach the preparation of polyetherin A 30-acylates having activity against Eimeria tenella and Eimeria acervulina. And further, Kubota et al., Japanese 72 14,224 (Apr. 27, 1972), teach the preparation of polyetherin A 29-ethers which are useful for the control of coccidiosis in chickens caused by Eimeria tenella or Eimeria acervulina.

And further in the prior art, Hamill et al., U.S. 3,705,- 238 (Dec. 5, 1972), teach antibiotics A204I and A204II and methods for their production, the antibiotics being taught as having anticoccidial, insecticidal, anti-PPLO, and antimicrobial activity.

Berger, U.S. 3,719,753 (Mar. 6, 1973), teaches the use of antibiotic X–537A in compositions for the treatment and prevention of coccidiosis in poultry.

Although a number of antibiotics have been used in compositions and methods for the control of coccidiosis, there remains a need for more effective and economically-useful compositions and methods for this treatment.

SUMMARY

A method for the control and/or prevention of coccidiosis, together with novel compositions useful in that method, which method and compositions empoly antibiotics A28695, A28695A, A28695B, and salts thereof are disclosed.

DETAILED DESCRIPTION

This invention relates to the use of certain acidic, non-nitrogenous antibiotics and the alkali metal, alkaline earth metal, and ammonium salts thereof as anticoccidial agents. More particularly, the invention relates to the use of antibiotics A28695A and A28695B, or the mixture thereof, identified as A28695, in a novel method and in novel compositions for the control and/or prevention of coccidiosis in poultry and in rabbits.

In the treatment of coccidiosis infections, relatively low levels of the A28695 antibiotics in poultry feed are sufficient to afford the poultry good protection against coccidiosis. Thus, one of the antibiotics, or the mixture, is administered to chickens in an amount equal to about 0.00125 percent to 0.03 percent by weight of the daily feed intake. The preferred range for antibiotic A28695A is from about 0.0025 to about 0.01 percent, with the optimum results being obtained when from about 0.0025 to about 0.005 percent (22.7–45.4 g./ton) of antibiotic A28695A, or 00.02 percent (181.6 g./ton) of antibiotic A28695B is incorporated into the poultry feed. The mixture, antibiotic A28695, is effective at from about 0.0025 percent to about 0.02 percent of the daily feed intake.

In addition to the utility of antibiotics A28695 as anticoccidial agents in poultry, it has also been determined that antibiotic A28695A is active as an anticoccidial agent in rabbits when administered in an amount equal to about 0.00125 percent to about 0.005 percent by weight of the daily feed intake, while about twice that amount of antibiotic A28695B is required to accomplish the same results.

The antibiotics utilized in this invention are arbitrarily designated A28695A and A28695B. They are produced, along with other unidentified antibiotic substances, by culturing the microorganism *Streptomyces albus* NRRL 3883 in an aqueous, nutrient culture medium under submerged aerobic fermentation conditions until a substantial level of antibiotic activity is produced. Antibiotic factor A28695A is produced in greater abundance than is antibiotic A28695B. The other antibiotic substances produced in the fermentation occur in such minor amounts as to render their recovery unrewarding.

Antibiotic A28695A, as isolated from the A28695 mixture of antibiotics, is obtained as a white, crystalline mixed sodium-potassium salt having a melting point of about 161°–165° C.

The mixed sodium-potassium salt of antibiotic A28695A is insoluble in water, slightly soluble in methanol, soluble in ether, and soluble in esters such as methyl acetate, ethyl acetate, and the like; ketones such as acetone and methyl ethyl ketone; the halogenated hydrocarbons such as chloroform; and the aromatic hydrocarbons such as benzene and toluene. Antibiotic A28695A, as the sodium-potassium salt, is stable in solution at pH values above pH 4.0 at temperatures up to about 27° C. The specific optical rotation, $[\alpha]_D^{25}$, of the mixed sodium-potassium salt of antibiotic A28695A is $+14.07°$ (C=1, methanol).

The infrared absorption spectrum of antibiotic A28695A, as the mixed sodium-potassium salt, in chloroform solution, is shown in FIG. 1 of the accompanying drawings. The following distinguishable absorption maxima in the spectrum are observable over the range of 2.0 to 15.0 microns: 3.1–3.3, 3.4, 3.47, 6.24, 6.84, 7.00, 7.25, 7.37, 7.49, 7.68, 7.78, 8.1, 8.47, 8.61, 8.95, 9.11, 9.20, 9.42, 9.5, 9.80, 9.98, 10.24, 10.54, 10.87, 11.09, 11.5, and 11.66 microns. The antibiotic A28695A has no characteristic ultraviolet absorption pattern.

A powder X-ray diffraction pattern of the crystalline mixed sodium-potassium salt of antibiotic A28695A, using vanadium-filtered chromium radiation, and a wave length value of 2.2896 Å for calculating the interplanar spacings, gives the following values:

| d | $I/I_1$ | d | $I/I_1$ |
|---|---|---|---|
| 18.23 | 1.00 | 5.92 | 0.30 |
| 14.75 | 1.00 | 5.59 | 0.10 |
| 13.26 | 0.40 | 5.43 | 0.40 |
| 12.05 | 0.60 | 5.24 | 0.10 |
| 9.53 | 0.40 | 5.09 | 0.20 |
| 9.01 | 0.50 | 4.94 | 0.40 |
| 8.27 | 0.30 | 4.76 | 0.05 |
| 8.02 | 0.30 | 4.57 | 0.10 |
| 7.61 | 0.30 | 4.35 | 0.05 |
| 7.36 | 0.50 | 4.16 | 0.02 |
| 6.93 | 0.02 | 4.09 | 0.10 |
| 6.69 | 0.60 | 3.98 | 0.05 |
| 6.02 | 0.40 | | |

The free acid of A28695A is a white crystalline solid melting at about 97°–99° C. Elemental analysis of the free acid form of antibiotic A8695A gives the following elemental composition: 63.31 percent carbon; 8.83 percent hydrogen, and 28.03 percent oxygen. Mass spectral data on antibiotic A28695A indicates an approximate molecular weight of 834. Electrometric titration of the sodium salt of antibiotic A28695A, in 66 percent aqueous ethanol, shows the presence of one titratable group which has a pKa value of 5.51. The molecular weight of the sodium salt, as determined from the titration data, is approximately 874. The molecular weight of the free acid would therefore be approximately 852. This value is higher than the value from the mass spectral data. The value calculated from the mass spectral data is probably the more accurate, because of the limitations of the titration method. Nuclear magnetic resonance spectral data indicate the presence of four methoxy groups in antibiotic A28695A.

The mixed sodium-potassium salt of antibiotic A28695B is a white, crystalline compound melting at about 170°–172° C. The solubility and stability pattern of the antibiotic is similar to that of the mixed sodium-potassium salt of antibiotic A28695A. The specific optical rotation, $[\alpha]_D^{25}$, of the mixed sodium-potassium salt of antibiotic A28695B is $+10.1°$ (C=1, methanol).

Figure 2:
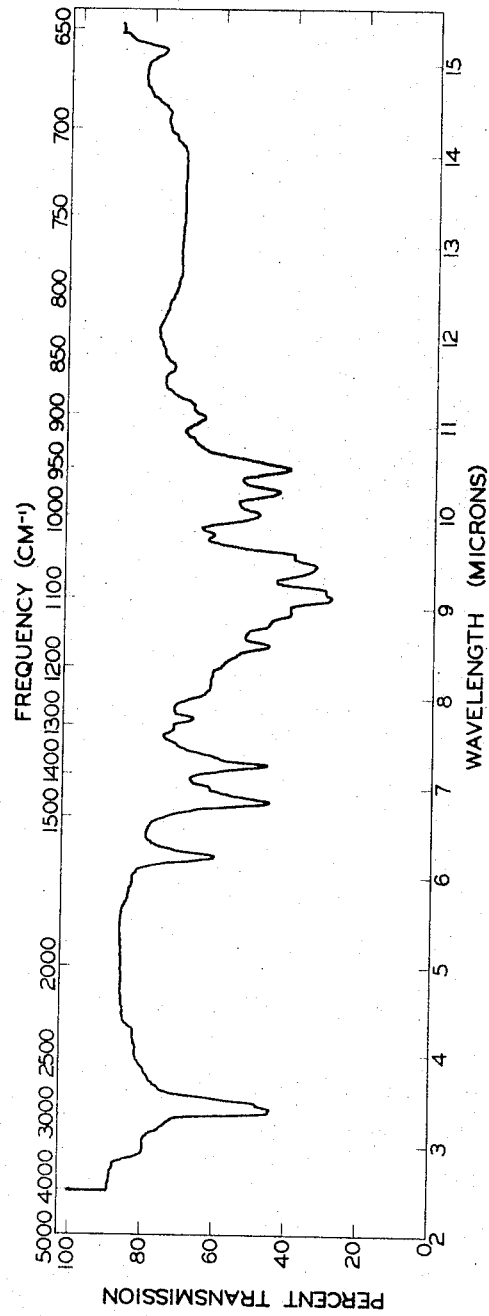

The infrared absorption spectrum of A28695B, as the mixed sodium-potassium salt in chloroform solution, is shown in FIG. 2 of the accompanying drawings. The distinguishable bands in the infrared spectrum over the range of 2.0 to 15.0 microns are as follows: 3.0, 3.4, 3.47, 6.24, 6.85, 7.01, 7.26, 7.3, 7.68, 7.78, 8.1, 8.58, 8.82, 8.95, 9.11, 9.19, 9.45, 9.59, 9.82, 10.04, 10.28, 10.55, 11.10, 11.24 and 11.65 microns. The antibiotic A28695B has no characteristic ultraviolet absorption pattern.

The acid form of antibiotic A28695B is a white crystalline solid with a melting point of about 122–124° C. Microanalysis gives the following percent elemental composition of the acid form of A28695B: 60.49 percent carbon; 9.15 percent hydrogen, and 31.32 percent oxygen. Nuclear magnetic resonance spectral data indicate that antibiotic A28695B contains three methoxy groups. Mass spectral data on antibiotic A28695B indicate an approximate molecular weight of 846. Electrometric titration of antibiotic A28695B, as the sodium salt in 66 percent aqueous ethanol, shows the presence of one titratable group having a pKa value of 5.9. The molecular weight of the sodium salt of antibiotic A28695B, calculated from the titration data, is approximately 877. The molecular weight of the free acid of antibiotic A28695B would therefore be approximately 855.

A powder X-ray diffraction pattern of the crystalline antibiotic A28695B acid, using vanadium-filtered chromium radiation, and a wave length value of 2.2895 Å for calculating interplanar spacings, gives the following values:

| d | $I/I_1$ | d | $I/I_1$ |
|---|---|---|---|
| 13.54 | .50 | 3.98 | .10 |
| 12.63 | .05 | 3.84 | .60 |
| 11.52 | .15 | 3.73 | .05 |
| 9.96 | .02 | 3.66 | .05 |
| 9.39 | .60 | 3.57 | .05 |
| 7.88 | .20 | 3.48 | .05 |
| 7.52 | .20 | 3.22 | .15 |
| 7.08 | .30 | 3.07 | .10 |
| 6.66 | 1.00 | 3.05 | .02 |
| 6.46 | .20 | 2.94 | .02 |
| 6.28 | .20 | 2.84 | .02 |
| 6.05 | .30 | 2.72 | .10 |
| 5.81 | .50 | 2.56 | .02 |
| 5.57 | .20 | 2.33 | .02 |
| 5.33 | .70 | 2.27 | .02 |
| 4.92 | .60 | 2.15 | .05 |
| 4.63 | .60 | 2.09 | .02 |
| 4.51 | .20 | 2.07 | .02 |
| 4.29 | .30 | 2.03 | .02 |
| 4.14 | .30 | | |

The paper chromatographic behavior of the mixed sodium and potassium salts of A28695A and B is shown by the Rf values in Table I below. The values were obtained in the indicated solvent systems, using in each instance Whatman No. 1 paper. The location of the antibiotics on the chromatogram was determined by bioautograph using *Bacillus subtilis* as the detecting organism.

TABLE I
Paper chromatography of antibiotics A28695A and A28695B

| Solvent system | Rf value* | |
| --- | --- | --- |
| | A28695A | A28695B |
| Water saturated with butanol | 0.53 | 0.83 |
| Water saturated with butanol; 2% p-toluene sulfonic acid; 1% piperidine | 0.64 | 0.76 |
| Water saturated with methyl isobutyl ketone; 2% p-toluene sulfonic acid; 1% piperidine | 0.58 | 0.74 |
| Water:methanol:acetone (12:3:1)** | 0.25 | 0.54 |
| Benzene saturated with water | 0.57 | 0.48 |

*Rf value is defined as the ratio of the distance traveled by the antibiotic from the origin to the distance traveled by the solvent front from the origin.
**This solution is adjusted to pH 10.5 with $NH_4OH$ and then the pH is lowered to pH 7.5 with $H_3PO_4$.

Thin-layer chromatography on silica gel plates with a vanillin spray as a detecting agent is also used to identify and separate antibiotic A28695A and B. The chromatographic behavior on silica gel is shown below.

TABLE II
Thin-layer chromatography of antibiotics A28695A and A28695B

| Solvent system | Rf value | |
| --- | --- | --- |
| | A28695A | A28695B |
| Benzene:ethyl acetate (1:1) | 0.71 | 0.61 |
| Chloroform:ethyl acetate (2:3) | 0.69 | 0.61 |
| Benzene:acetone (9:1) | 0.29 | 0.20 |

The A28695 antibiotics have the ability to form complexes with monovalent cations. In experiments to determine ion specificity, antibiotic A28659A showed specificity for potassium ions and rubidium ions, while antibiotic A28695B showed specificity for sodium and potassium ions. The use of ion-specific electrodes is important in many chemical analyses. Because of the unique properties, antibiotics A28695A and B are suitable as components of ion-specific electrodes.

The antibiotics useful in this invention are produced by culturing a newly discovered strain of an actinomycete organism under submerged aerobic conditions in a nutrient culture medium until the culture medium contains substantial antibiotic activity. The antibiotics can be recovered from the fermentation medium by employing various isolation and purification procedures known in the art.

The actinomycete used in the production of the antibiotics useful in this invention has been identified as a strain of *Streptomyces albus* (Rossi-Doria) Waksman and Henrici. The organism has been deposited without restriction as to availability with the permanent culture collection of the Northern Utilization Research and Development Division, Agricultural Research Service, United States Department of Agriculture, Peoria, Illinois. Its accession number in this collection is NRRL 3883. The strain was isolated from a soil sample collected in Curacao (Dutch Antilles). Portions of the soil sample were suspended in sterile deionized water and the suspensions were streaked on nutrient agar in Petri plates. After incubation at 25°–35° C. until growth was attained, colonies of the antibiotic A28695-producing organisms were transferred to agar slants with a sterile platinum loop. The agar slants were then incubated to provide a suitable inoculum for the production of A28695.

The methods employed in the taxonomic studies of the A28695-producing culture, NRRL 3883, were those recommended for the International Streptomyces Project [Shirling and Gottlieb, *Intern. Bull. Systematic Bacteriol.*, 16:313–340 (1966)], together with certain supplementary tests. Results of the taxonomic studies are summarized in the paragraphs which follow. Color names were assigned according to the Inter-Society Color Council—National Bueau of Standads (ISCC–NBS) method (Kelly and Judd, *The ISCC–NBS Method of Designating Colors and a Dictionary of Color Names*, U.S. Dept. of Commerce Circ. 553, Washington, D.C., 1955). Letters in parentheses refer to color blocks and underlined letters and numbers to color tabs in the Tresner and Backus color series [*Appl. Microbiol.* 11:335–338 (1963)]. The Maerz and Paul color block designations, [*Dictionary of Color*, Mc-Graw-Hill Book Co., Inc., New York (1950)], are enclosed in brackets. ISP numbers refer to International Streptomyces Project media, Shirling and Gottlieb, (available from Difco Laboratories, Detroit, Michigan). Observations were made following incubation at 30° C. for fourteen days unless otherwise noted.

Microscopic Morphology, Cultural Characteristics, and Physiology

| | |
| --- | --- |
| Microscopic morphology | Sporophores are spiralled. Spores are oval (1.0–1.25μ x 0.5–1.0μ) and occur in chains of 10 to 50. |
| Cultural characteristics: | |
| ISP medium #2 | Abundant growth; reverse light yellow brown [11E5]. Good aerial mycelium and sporulation, white (W)a. No soluble pigment. |
| ISP medium #3 | Fair growth; reverse white. Fair aerial mycelium and sporulation white (W)a, with scattered areas of light yellow, (Y)1½ fb. |
| ISP medium #4 | Abundant growth; reverse pale yellow [10F3]. Abundant aerial mycelium and sporulation, white (W)a. Light brown soluble pigment. |
| ISP medium #5 | Good to abundant growth; reverse light yellow [10J2]. Good to abundant aerial mycelium and spores, pale yellow (Y)2ba. No soluble pigment. |
| Calcium malate | Good growth; reverse light yellow [10F3]. Moderate aerial mycelium and sporulation, pale yellow (Y)1ba. None to slight yellow soluble pigment. |
| Czapek's medium | Good growth; reverse light yellow [9J2]. Good aerial mycelium and sporulation, pale yellow (Y)2ba. No soluble pigment. |
| Tomato paste oatmeal | Abundant growth; reverse pale yellow [10–B2]. Good aerial mycelium and sporulation, yellowish gray (G)2dc. No soluble pigment. |
| Physiology: | |
| Temperature requirements | Good growth and sporulation at 26°–37° C. No growth at 43° C., 49° C., or 55° C. |
| Skim milk | No curd or clearing after 21 days. Surface ring of growth; sediment. |
| Gelatin | Complete liquefaction after 21 days. |
| Nitrate reduction | Slight reduction after 21 days. |

Table VI summarizes the results of the carbon utilization tests carried out on the A28695-producing culture, NRRL 3883. Symbols employed in the table are as follows:

+ =positive utilization
(+)=probable utilization
(−)=questionable utilization
− =no utilization

TABLE VI
Carbon Utilization of NRRL 3883

| Substrate: | Response |
| --- | --- |
| Inositol | (+) |
| Mannitol | + |
| Cellulose | (−) |
| Cellobiose | + |
| Fructose | + |
| Arabinose | + |
| Rhamnose | + |
| Raffinose | + |
| Xylose | + |
| Dextrose | (+) |

The A28695-producing culture (NRRL 3883) appears to be very similar to the strain of *Streptomyces albus* ATCC 3004 as described by Lyons and Pridham, *J. Bacteriol.*, 83:370–380 (1962). Variations occur in the utilization of four carbon sources and in growth above 37° C. The NRRL 3883 culture employed in this invention is also similar to NRRL 3384, which produces antibiotic A204 [Belgian Pat. No. 728,382(8–13'69)]; observed differences indicate that NRRL 3384 produces slightly longer spores, does not liquefy gelatin, and grows at somewhat higher temperatures.

The culture medium employable in producing antibiotics A28695A and B by cultivation of the above-described organism can be any one of several media, since, as is apparent from the above-described utilization tests, the organism is capable of utilizing different energy sources. However, for economy of production, maximum yield of antibiotic, and ease of isolation of the antibiotic, certain culture media containing relatively simple nutrient sources are preferable. For example, the media useful in the production of antibiotics A28695A and B include an assimilable source of carbon such as glucose, mannitol, fructose, soluble starch, dextrin, molasses, brown sugar and the like. Preferred sources of carbon are glucose and dextrin. Additionally, employable media include a source of assimilable nitrogen such as oatmeal, beef extract, hydrolyzed casein, corn steep liquor, yeast extract, soybean meal, peptones (meat or soy) and the like. Preferred sources of nitrogen are soybean meal and acid-hydrolyzed casein.

Mineral salts, for example those providing calcium, magnesium, sodium, potassium, cobalt, chloride, sulfate and carbonate ions, and a source of growth factors, such as yeast or yeast extract, can be incorporated into the media with beneficial results.

As with many microorganisms, it is believed to be desirable to include the so-called "trace elements" in the culture medium for growing the actinomycete employed to produce the antibiotics used in this invention. Such trace elements are commonly supplied as impurities incidental to the addition of the other constituents of the medium.

Production of the antibiotics used in this invention can be effected at any temperature conducive to satisfactory growth of the microorganism, for example, between about 26° C. and 40° C. and preferably between about 26°–30° C. Ordinarily, optimum production of the antibiotics is obtained in about two to five days.

The initial pH of the culture medium can be varied widely. However, it has been found desirable that the initial pH of the medium be between about pH 6.5 and about pH 7.2. As has been observed with other actinomycetes, the pH of the medium gradually increases throughout the growth period of the organism and may attain a level of from about pH 7.0 to about pH 8.0 or above. The final pH is dependent at least in part on the initial pH of the medium, the buffers present in the medium, and the period of time the organism is permitted to grow. Small quantities of the antibiotic are obtained conveniently by the use of shake flasks and by surface culture in bottles. For the production of substantial amounts of antibiotic A28695, however, submerged aerobic culture in large tanks is preferably employed.

In order to avoid a pronounced lag in the production of the antibiotic with the attendant inefficient utilization of equipment, it is preferred to use the vegetative rather than the spore form of the organism for inoculation of the medium in the production tanks. Accordingly, a vegetative inoculum or the organism is first prepared by inoculating a relatively small quantity of the culture medium with the spore form of the organism, and the young, active vegetative inoculum so obtained is then transferred aseptically to the large production tanks. The medium in which the vegetative inoculum is produced can be the same as that utilized for the production of the antibiotic, although other media can be employed advantageously.

As is customary in submerged aerobic culture processes, sterile air is blown through the culture medium. For efficient growth of the organism and antibiotic production, the volume of air employed in the tank production of antibiotics A28695A and A28695B is preferably about 1 volume of air per minute per volume of culture medium. Efficient growth and optimal yields of antibiotics A28695A and A28695B are obtained when the volume of air used is at least three-tenths volume of air per minute per volume of culture medium.

The concentration of antibiotic activity in the culture medium can be followed readily during the fermentation period by testing samples of the culture medium for their inhibitory activity against the growth of an organism known to be inhibited in the presence of antibiotics A28695A and A28695B. The use of the organism *Bacillus subtilis* has been found to be suitable for this purpose. The testing can be carried out by well-known turbidimetric or disc plate assay methods.

A variety of procedures can be used in the isolation and purification of antibiotics A28695A and A28695B, for example, solvent extraction, and use of adsorbents and chromatography columns. Solvent extraction procedures are preferred for commercial production inasmuch as they are less time consuming and less expensive, and higher recovery yields are obtained thereby.

The antibiotic activity is located in the mycelium as well as in the fermentation beer. The mycelium can be separated from the fermentation beer by filtration with the use of a filter aid, and both the mycelial cake and the filtered fermentation medium extracted with a suitable organic solvent to recover the A28695 activity. Alternatively, the unfiltered fermentation beer can be extracted with an organic solvent to recover the antibiotic activity. Suitable extraction solvents include, for example, ethyl acetate, amyl acetate, ethanol or methanol. The antibiotic extracts are evaporated under reduced pressure to obtain an impure mixture of the A28695 antibiotics as an oily residue. The antibiotics thus recovered are present in the form of their mixed sodium-potassium salts. Further purification of the antibiotic mixture can be accomplished by chromatography of the oily residue over a suitable adsorbent such as activated carbon or silica gel. An activated carbon adsorbent such as Pittsburgh Carbon is a preferred adsorbent for purifying the A28695 antibiotic mixture.

The individual antibiotics can be separated from the mixture by further chromatography. Thus, for example, the mixture of the sodium-potassium salts of A28695A and B can be dissolved in a solvent system consisting of benzene:ethyl acetate (9:1) and the solution so obtained chromatographed on a column packed with silica gel. The column is then eluted with the same solvent mixture and multiple fractions are collected. The progress of the fractionation is monitored by examining the individual fractions on thin-layer chromatograms or paper chromatograms. The fractions containing each individual antibiotic are combined and the solvent is removed by evaporation to yield, in substantially pure form, the separated antibiotics in the form of their mixed sodium-potassium salts.

The preparation of antibiotics A28695A and A28695B is further illustrated by the following examples.

EXAMPLE 1

A. Shake-flask fermentation of A28695

The A28695-producing culture is prepared and maintained on an agar slant having the following composition:

| | | |
|---|---|---|
| Dextrin 700 [1] | g | 10.0 |
| N-Z amine A [2] | g | 2.0 |
| Beef extract | g | 1.0 |
| Yeast extract | g | 1.0 |
| Agar | g | 20.0 |
| Deionized water | l | 1 |

[1] Potato dextrin imported from Holland.
[2] Sheffield Chemical Co., Division of National Dairy Products Corp., Norwich, N.Y.

The slant is inoculated with the A28695-producing culture, NRRL 3883, and incubated at 30° C. for about 4–6 days. The sporulated slant is covered with a small amount of sterile deionized water and gently scraped to provide an aqueous spore suspension.

One milliliter of the resulting spore suspension is used to inoculate 100 ml. of sterile vegetative medium having the following composition:

| Ingredient | Amount |
|---|---|
| Glucose | g__ 15.0 |
| Soybean meal | g__ 15.0 |
| Corn steep solids | g__ 5.0 |
| $CaCO_3$ | g__ 2.0 |
| NaCl | g__ 5.0 |
| Tap water | l__ 1 |

The inoculated vegetative medium is incubated for about 24–48 hours at 30° C. on a reciprocal shaker having a two-inch stroke operating at 108 strokes per minute, or on a rotary shaker operating at 250 r.p.m. A 5 ml. portion of the resulting culture is then employed to inoculate 100 ml. of sterilized production medium contained in a 500 ml. Erlenmeyer flask and having the following composition:

| Ingredient | Amount |
|---|---|
| Soybean meal | g__ 15.0 |
| Casein | g__ 1.0 |
| $NaNO_3$ | g__ 3.0 |
| Glucose syrup | g__ 20.0 |
| Tap water | l__ 1 |

The inoculated production medium is allowed to ferment for 42–72 hours at 25°–30° C. on either a rotary shaker operating at 250 r.p.m., or on a reciprocal shaker operating at 108 strokes per minute. The observed terminal pH is between about pH 6.5 and pH 8.0.

B. Tank fermentation of A28695

The A28695-producing culture is prepared and maintained on an agar slant having the following composition:

| Ingredient | Amount |
|---|---|
| Dextrin | g__ 10.0 |
| Yeast extract | g__ 1.0 |
| Enzyme-hydrolyzed casein | g__ 2.0 |
| Beef extract | g__ 1.0 |
| $CoCl_2 \cdot 6H_2O$ | g__ 0.01 |
| Agar | g__ 20.0 |
| Deionized water | l__ 1 |

The pH of the medium is adjusted to pH 7.0 with sodium hydroxide solution. After steam sterilization, by autoclaving at 15–20 pounds pressure for thirty minutes, the pH of the medium is pH 6.9.

The slant is inoculated with the A28695-producting culture, NRRL 3883, and incubated at 30° C. for 10 days. The sporulated slant is covered with a small amount of sterile deionized water and gently scraped to provide an aqueous spore suspension.

Each slant is used to inoculate six 250 ml. flasks, each containing 50 ml. of sterile vegetative culture medium having the following composition:

| Ingredient | Amount |
|---|---|
| Glucose | g__ 15.0 |
| Soybean grits | g__ 15.0 |
| Corn steep liquor | g__ 10.0 |
| NaCl | g__ 5.0 |
| $CaCO_3$ | g__ 2.0 |
| Tap water | liters__ 1.1 |

The pH of the medium is adjusted to pH 6.5 with sodium hydroxide solution and is unchanged by sterilization by autoclaving at 15–20 pounds pressure for 30 minutes.

The inoculated, sterilized medium is allowed to ferment for about 72 hours at 30° C. on a rotary shaker operating at 250 r.p.m. A 10 ml. portion of the resulting culture is used to inoculate 200 ml. of sterilized second-stage growth medium contained in a liter flask and having the same composition described above.

The inoculated medium is allowed to ferment for about 30 hours at about 30° C. on a reciprocal shaker operating at 250 r.p.m. A 200 ml. portion of the resulting culture is used to inoculate 25 liters of the following medium in a 40-liter fermentor.

| Ingredient | Percent |
|---|---|
| Glucose | 2.5 |
| Soybean grits | 1.5 |
| Acid-hydrolyzed casein | 0.1 |
| Molasses | 0.3 |
| $CaCO_3$ | 0.25 |
| Tap water | 25 liters |

The pH of the medium is about pH 7.2 after sterilization by autoclaving at 15–20 pounds pressure for 30 minutes.

The inoculated medium is aerated at a rate of one volume of air per volume of culture per minute and is stirred with conventional agitators at 350 r.p.m.

The fermentation is carried out at about 30° C. for about 5 days.

C. Isolation of Antibiotic Mixture

Ninety-two liters of whole fermentation broth obtained from an A28695 fermentation was filtered with the aid of a commercial filter aid. The mycelial cake was suspended in 25 liters of methanol, and the mixture was stirred vigorously for about 30–60 minutes. The mixture was then filtered, and the filtrate was concentrated to remove the methanol. The aqueous phase so obtained was combined with the filtrate from the original fermentation broth.

The extracted mycelial cake was then suspended in 25 liters of ethyl acetate and the suspension was stirred for about 30–60 minutes. The mixture was then filtered, and the mycelial cake was discarded. The ethyl acetate extract of the mycelial cake was saved to combine with the ethyl acetate extracts of the filtered broth. The filtered broth was then extracted twice with half volumes of ethyl acetate. The spent broth was discarded. The ethyl acetate extracts of the broth were combined with the ethyl acetate extract of the mycelial cake.

Alternatively, the A28695 activity was extracted from the unifiltered fermentation medium by the following procedure: Ninety-two liters of the whole fermentation medium was stirred with an equal volume of ethyl acetate. The mixture was filtered and the resulting filtrate was separated into the ethyl acetate phase and the aqueous phase. The aqueous phase was discarded, and the ethyl acetate phase was saved to be combined with a second extract.

The extracted mycelial mass was then extracted a second time with ethyl acetate. The mycelial mass was discarded. The ethyl acetate extract was combined with the original extract.

The pooled extracts, obtained by extraction of either whole fermentation medium, or of the broth and mycelium separately, were concentrated to an oily residue. This oily residue was dissolved in one liter of chloroform. The chloroform solution was passed over a 5.5 cm. x 100 cm. column of Pittsburgh Carbon (12 x 40 mesh) packed in chloroform. The column was washed with 20 liters of chloroform. The chloroform effluent and wash were combined and concentrated to a dry residue. Seventy and four-tenths grams of A28695 activity was recovered.

D. Separation of Antibiotics A28695A and A28695B

Thirty grams of crude antibiotic mixture A28695, obtained according to the procedure described in the previous section, was dissolved in a 9:1 mixture of benzene and ethyl acetate. The solution was passed over a 5.5 cm. x 115 cm. column of silica gel (Grace grade number 62, Davison Chemical, Baltimore, Md. 21226). The adsorbent had previously been washed with benzene:ethyl acetate (9:1). The column was washed with six liters of benzene:ethyl acetate (9:1) and the effluent and wash were discarded. The column was then eluted with a benzene:ethyl acetate solution (4:1). The eluate was collected in multiple fractions, antibiotic A28695A coming off the column in the early fractions, while antibiotic A28695B was collected in subsequent fractions. The identity of the antibiotic in the respective column fractions was determined by paper chromatography and thin-layer chromatography. The column fractions containing the same antibiotic were combined and evaporated *in vacuo* to yield the respective individual antibiotics in substantially pure form.

Antibiotic A28695A was crystallized by dissolving the amorphous antibiotic in warm ether. The antibiotic crystallized as the mixed sodium-potassium salt with a melting point of about 163°–165° C. Yield: 11.8 grams.

Antibiotic A28695B was also crystallized from ether in the form of the mixed sodium-potassium salt with a melting point of about 152–154° C. Yield: 5.3 grams.

EXAMPLE 2

Preparation of Acid Form of Antibiotic A28695A

Five grams of the mixed sodium and potassium salt of antibiotic A28695A was dissolved in 105 ml. of dioxane. Forty ml. of water was added to the solution. The pH of the solution was adjusted to pH 4 with hydrochloric acid. The solution was concentrated *in vacuo* to remove the dioxane. The resulting aqueous solution was extracted twice with an equal volume of ethyl acetate and the spent aqueous phase was discarded. The ethyl acetate extracts were combined and were concentrated to dryness. The dried residue was dissolved in warm ethyl ether. The ether solution was chilled overnight to allow antibiotic A28695A to crystallize. The crystals were recovered by filtration and dried. Yield: 4.5 g. M.P. 97°–99° C.

EXAMPLE 3

Preparation of Acid Form of Antibiotic A28695B

One hundred mg. of A28695B in the form of the mixed sodium-potassium salt was dissolved in 25 ml. of dioxane. Twenty ml. of water was added to the resulting solution and the pH was adjusted to pH 4.0 with hydrochloric acid. The solution was concentrated *in vacuo* in order to remove the dioxane. The resulting aqueous solution was extracted with an equal volume of ethyl acetate and the spent aqueous phase was discarded. The ethyl acetate extract was concentrated to dryness. The dried residue was dissolved in a minimum quantity of warm ethyl ether. The ether solution was held in the cold in order to allow crystallization of A28695B. The crystals were recovered by filtration and dried. Yield 87 mg. M.P. 122°–124° C.

EXAMPLE 4

Preparation of the sodium salt of A28695A

Two hundred milligrams of A28695A acid, prepared according to the procedure described by Example 2, was dissolved in 10 ml. acetone. To the solution was added, with stirring, 5 ml. of water, and the pH of the solution was adjusted to pH 9.0 with 1N sodium hydroxide. The acetone was slowly evaporated by placing the solution under a stream of nitrogen. A precipitate formed which was recovered and then dissolved in a minimum quantity of diethyl ether. The solution was evaporated to a small volume and chilled at 5° C. overnight. The resulting crystals were filtered and dried to yield 33 mg. of A28695A sodium salt melting at about 159–160° C.

EXAMPLE 5

Preparation of A28695A ammonium salt

Two hundred milligrams of A28695A acid, prepared according to the procedure in Example 2, was dissolved in 10 ml. of acetone, and 5 ml. of water was added to the solution. The pH of the solution was adjusted to pH 9.0 with concentrated ammonium hydroxide. The acetone was slowly evaporated by placing the solution under a stream of nitrogen. After the acetone had been evaporated from the solution, a noncrystalline precipitate formed. The suspension was extracted with an equal volume of diethyl ether and the resulting ether solution was concentrated to a small volume by placing the solution under a stream of nitrogen. The concentrated solution was allowed to sit at 5° C. overnight. A crystalline precipitate formed which was filtered off and dried to yield 120 mg. of product melting at about 124–125° C.

EXAMPLE 6

Preparation of the sodium salt of A28695B

Two hundred milligrams of the acid form of A28695B, prepared according to the procedure described in Example 3, was dissolved in 10 ml. of acetone, and 5 ml. of water was added slowly, with stirring, to the resulting solution. The pH of the solution was adjusted to pH 9.0 with 1N NaOH. The acetone was slowly evaporated by placing the solution under a stream of nitrogen. After the acetone had been evaporated from the solution, a crystalline precipitate began to form. The suspension was allowed to stand at 5° C. overnight in order for the crystallization to be complete. The crystals were filtered and dried to yield 150 mg. of A28695B sodium salt melting at about 161–162° C.

EXAMPLE 7

Preparation of the ammonium salt of A28695B

Two hundred milligrams of A28695B free acid, prepared according to the procedure described in Example 3, was dissolved in 10 ml. of acetone, and 5 ml. of water was added to the resulting solution slowly, with stirring. The pH of the solution was adjusted to pH 9.0 with concentrated ammonium hydroxide solution. The acetone was evaporated from the solution by placing the solution under a stream of nitrogen. A crystalline precipitate began to form after the acetone had evaporated from the solution. The suspension was allowed to stand at 5° C. to complete the crystallization. The crystals of the ammonium salt of A28695B were recovered by filtration and dried to yield 138 mg. of product melting at about 124–125° C.

In accordance with the present invention, it has been discovered that the A28695 antibiotics, and their physiologically-acceptable salts, the alkali metal, alkaline earth, and basic nitrogen salts, such as ammonium salts, are potent anticoccidial agents, which, when administered to poultry and rabbits, arrest the development of coccidia and hence are prophylactic agents in controlling coccidiosis. Suitable alkali metal salts include the sodium, potassium, and lithium salts, and sodium-potassium mixed salts. Suitable alkaline earth metal salts include the calcium and barium salts, and the like. These new anticoccidial agents are conveniently fed to poultry or rabbits as a feed component, although the agents may also be suspended in the drinking water. Thus, novel compositions are provided which comprise A28695 antibiotics intimately admixed with an edible, inert, solid carrier or diluent to provide a premix for medicated food supplement. An inert, edible carrier or diluent is one that is non-reactive with respect to the A28695 antibiotics. The carrier or diluent is preferably one that is or may be an ingredient of animal feed.

The preferred compositions of this invention are feed premixes in which the A28695 antibiotics are present in relatively large amounts and which are suitable for addition to the poultry or rabbit feed either directly or after an intermediate dilution or blending step. Examples of carriers or diluents suitable for such compositions are animal feed ingredients such as distillers' dried grains, soybean mill run, alfalfa granules, wheat middlings, corn gluten meal, exfoliated hydrobiotites, corn meal, citrus meal, fermentation residues, ground oyster shells, Attapulgus clay, wheat shorts, molasses solubles, corncob meal, edible vegetable substances, toasted dehulled soya flour, soybean feed, soybean meal feed, antibiotic mycelia, soya grits, kaolin, talc, crushed limestone, and the like. The preferred diluents are soybean products such as soybean mill run and soybean feed, and alfalfa products such as alfalfa granules, as well as corn products such as corn gluten meal and corn grits.

The compositions can be prepared by intimately dispersing or admixing the A28695 antibiotics as the pure compounds, a salt thereof, the mycelial cake, or the dried broth throughout the solid inert carrier by methods such as grinding, stirring, milling, or tumbling. In some instances, the antibiotic may be adsorbed on the carrier by spraying a solution of the antibiotic into a rotating mill containing the carrier. By selecting proper carriers and by altering the ratio of carrier to active ingredient, compositions of any desired concentration can be prepared.

The feed premixes can be formulated so that the total active ingredient is present within the range of 5 percent to 80 percent by weight and the diluent or carrier present is correspondingly within the range of 95 percent to 20 percent by weight of the premix. The preferred ratio is about 8 percent by weight of antibiotic A28695A to about 92 percent by weight of the diluent. The preferred ratio for antibiotic A28695B is about 30 percent of antibiotic to about 70 percent by weight of the diluent. The premixes may be further diluted with an animal feed supplement or may be added directly to an animal feedstuff in order to provide a suitable medicated feedstuff which can be eaten directly by the poultry or rabbits.

The feed supplement may be further diluted with materials such as corn meal, corn grits, corn gluten meal, or soybean meal before being incorporated in the animal feed. This dilution serves to facilitate uniform distribution of the anticoccidial agents in the finished feed. The finished feed is one that contains a source of fat, protein, carbohydrate, minerals, vitamins and other nutritional factors.

In the treatment of coccidiosis infections, relatively low levels of the A28695 antibiotics in poultry or rabbit feed are sufficient to afford the poultry or rabbits good protection against coccidiosis. One of the antibiotics, antibiotic A28695A or A28695B, or the mixture of antibiotics from which they can be separated, identified as A28695, is administered to chickens in an amount equal to about 0.00125 percent to about 0.03 percent by weight of the daily feed intake. The preferred range for the mixture, antibiotic A28695, is from about 0.0025 percent to about 0.02 percent by weight of the daily feed intake. The preferred range for antibiotic A28695A is from about 0.0025 to about 0.01 percent, with the optimum results being obtained when from about 0.0025 to about 0.005 percent (22.7–45.4 g./ton) is incorporated into the poultry feed. The preferred range for antibiotic A28695B is from about 0.015 to about 0.03 percent by weight of the antibiotic incorporated into the poultry feed, with 0.02 percent (181.6 g./ton) of antibiotic A28695B being the optimum level for that antibiotic. Antibiotic A28695A, when administered in an amount equal to about 0.00125 percent to about 0.005 percent by weight of the rabbit feed, is efficacious as an anticoccidial agent in rabbits. About twice as much antibiotic A28695B is necessary in rabbits to accomplish the same result as with A28695A.

The most advantageous dosage level will, of course, vary somewhat with particular circumstances such as the type and severity of the coccidial infection to be treated, the daily feed intake of the birds or rabbits, and the like.

Prior to the administration of the medicated feed to the poultry or rabbits, the premix is uniformly dispersed in the animal feed by suitable mixing or blending procedures.

In the above discussion of the invention, emphasis has been placed on solid compositions wherein the active ingredient is mixed with an edible carrier in a premix, or in the final poultry or rabbit feedstuff.

An alternative method of treatment is to administer a suspension containing a theraputically-effective amount of the mixture of A28695 antibiotics, or antibiotic A28695A or A28695B, respectively, or a salt thereof, in the drinking water of the poultry. The quantity of the anticoccidial agent which can be administered in this fashion is, of course, limited by the solubility of the antibiotics in water or by the quantity that can be suspended in the water without undue settling. Emulsifiers or surfactants can be employed in order to increase the amount of antibiotic which may be suspended in solution.

In treating poultry according to the method of this invention, the antibiotic can be administered starting with very young chicks. Thus, 1-day-old broiler cockerels are started on the medicated feed containing the A28695 antibiotic. This procedure applies for broilers, roasters, fryers, and for replacement stock for layer or broiler breeder flocks. Broiler birds are maintained on the medicated feed of this invention throughout their life. Replacement stock for layer flocks are maintained on this medicated feed for about 14 to 22 weeks.

Generally speaking, the antibiotic, or one of its salts, is added to a conventional basal ration which can comprise the following ingredients: meat and bone scrap; fishmeal; Vitamin $B_{12}$; poultry by-product meal; dehulled soybean oil meal; dehydrated alfalfa meal; corn gluten meal; pulverized oats; ground barley; cornmeal; wheat middlings; dried grain and whey fermentation solubles; methionine hydroxy analogue calcium; riboflavin; calcium pantothenate; choline chloride; niacin; animal fat; menadione sodium bisulfite; Vitamin E supplement; butylated hydroxy toluene; Vitamin A palmitate; D-activated animal sterol; calcium carbonate; defluorinated phosphate; salt; calcium iodate; manganese oxide; zinc oxide; cobalt hydroxide; and cobalt carbonate.

The efficacy of the A28695 antibiotics as anticoccidial agents in both chickens and rabbits has been demonstrated in a series of experiments. In general, the experiments are carried out as described hereinafter.

For the studies in chickens, groups of about five 8-day-old chicks are fed a standard diet containing therein a uniformly dispersed A28695 antibiotic. After being on this ration for about 48 hours, each bird is inoculated with sporulated oocysts of the particular species of *Eimeria* being tested.

Other groups of five, 8-day-old chickens are fed a standard diet which does not contain an A28695 antibiotic. Some of these latter groups are also inoculated with *Eimeria* after 48 hours and they serve as infected controls. Others of these latter groups are not inoculated with *Eimeria* and they serve as normal controls.

The results of the treatment are evaluated 7 days after the inoculation. The birds are weighed, sacrificed, and examined for evidence of coccidial lesions. The percent reduction in lesion score is calculated by subtracting the average lesion score of the treated group from the average lesion score of the infected control group, dividing this difference by the average lesion score of the infected control group, and multiplying the quotient by 100.

The percent weight gain is calculated using the weight gain of normal controls as 100 percent.

The experiments and the results are set forth hereinbelow.

EXAMPLE 1

The efficacy of the A28695 antibiotics A and B in controlling coccidiosis in chickens was determined by adding each antibiotic to the feed of chickens infected with a combined infection of *Eimeria tenella, Eimeria necatrix, Eimeria maxima* and *Eimeria acervulina*.

The results are set forth in the following Table I.

TABLE I

Activity of A28695 antibiotics against coccidiosis in chickens

| Test Group | Level in feed, percent by weight | Mortality | Percent Weight gain* | Reduction in lesion scores** Intestinal | Cecal |
|---|---|---|---|---|---|
| A28695A | 0.01 | 0 | 76 | 100 | 100 |
|  | 0.005 | 0 | 100 | 100 | 66 |
|  | 0.0025 | 0 | 80 | 90 | <40 |
| A28695B | 0.02 | 0 | 90 | 100 | 96 |
| Infected controls |  | 15 | 36 | 0 | 0 |
| Normal controls |  | 0 | 100 |  |  |

*Normal controls taken as 100%.
**Compared with infected controls.

EXAMPLE 2

A test of the efficacy of the A28695 antibiotics A and B against *Eimeria tenella* in chickens was carried out and the results are shown in the following Table II.

TABLE II

Efficacy of antibiotics A28695A and A28695B against *Eimeria tenella* in chickens

| Test group | Level in feed, percent by weight | Mortality | Percent Weight gain* | Reduction in lesion scores** |
|---|---|---|---|---|
| A28695A | .005 | 0 | 100 | 90 |
|  | .0025 | 0 | 100 | 33 |
|  | .00125 | 0 | 80 | 0 |
| A28695B | .03 | 0 | 93 | 100 |
|  | .02 | 0 | 100 | 100 |
| Infected controls |  | 20 | 72 | 0 |
| Normal controls |  | 0 | 100 |  |

*Normal controls taken as 100%.
**Compared with infected controls.

EXAMPLE 3

The efficacy of antibiotic A28695A in controlling coccidiosis in chickens infected with *Eimeria necatrix* was determined by adding the antibiotic to the feed of chickens.

The chickens, 8-day-old broiler cockerels, were divided into groups of five birds per cage, four cages per treatment. The birds were fed a standard diet containing antibiotic A28695A uniformly dispersed therein. Forty-eight hours after the medication was commenced, each of the birds was inoculated with sporulated oocysts of *E. necatrix*.

Other groups of five, 8-day-old broiler cockerels were fed the standard diet which did not contain antibiotic A28695A. Some of these groups were also inoculated with *E. necatrix* after 48 hours and served as infected controls. Those not infected served as normal controls. The test was terminated 7 days after the inoculation. The birds were weighed, sacrificed and examined for evidence of coccidial lesions. The results were calculated as described, *supra*, and are shown in Table III, which follows.

TABLE III

| Test group | Level in feed, percent by weight | Mortality | Percent Weight gain* | Reduction in lesion scores** |
|---|---|---|---|---|
|  | *E. necatrix* |  |  |  |
| A28695A | .01 | 0 | 53 | 100 |
|  | .005 | 0 | 96 | 100 |
|  | .0025 | 0 | 99 | 79 |
|  | .00125 | 0 | 73 | 48 |
| Infected controls |  | 80 | 25 |  |
| Normal controls |  | 0 | 100 |  |

*Normal controls taken as 100%.
**Compared with infected controls.

EXAMPLE 4

The efficacy of antibiotic A28695A in controlling coccidiosis in chickens infected with *Eimeria brunetti* was determined by adding the antibiotic to the feed of the chickens.

The chickens, 8-day-old broiler cockerels, were divided into groups of five birds per cage, four cages per treatment. The birds were fed a standard diet containing antibiotic A28695A uniformly dispersed therein. Forty-eight hours after the medication was commenced, each of the birds was inoculated with sporulated oocysts of *E. brunetti*.

Other groups of five 8-day-old broiler cockerels were fed the standard diet which did not contain antibiotic A28695A. Some of these groups were also inoculated with *E. brunetti* after 48 hours and served as infected controls. Those not infected served as normal controls. The test was terminated 7 days after inoculation. The birds were weighed, sacrificed, and examined for evidence of coccidial lesions. The results are set forth in Table IV, which follows.

TABLE IV

| Treatment | Diet | Mortality | Percent Weight gain* | Reduction lesion score** |
|---|---|---|---|---|
|  | *E. brunetti* |  |  |  |
| A28695A | .005 | 0 | 90 | 70 |
|  | .0025 | 0 | 62 | 65 |
|  | .00125 | 0 | 52 | (***) |
| Infected controls |  | 0 | 47 |  |
| Normal controls |  | 0 | 100 |  |

*Normal controls taken as 100%.
**Compared with infected controls.
***Less than 30%.

EXAMPLE 5

The efficacy of antibiotic A28695A in controlling coccidiosis in chickens infected with *Eimeria mivati* was determined in the same manner, with the same age and type of chickens as described in Example 4. The dosage levels of antibiotic A28695A were the same. The test results are set forth in Table V, which follows.

TABLE V

| Treatment | Diet | Mortality | Percent Weight gain* | Reduction lesion score** |
|---|---|---|---|---|
|  | *E. mivati* |  |  |  |
| A28695A | .005 | 0 | 95 | 100 |
|  | .0025 | 0 | 106 | 100 |
|  | .00125 | 0 | 66 | (***) |
| Infected controls |  | 0 | 38 |  |
| Normal controls |  | 0 | 100 |  |

*Normal controls taken as 100%.
**Compared with infected controls.
***Less than 30%.

EXAMPLE 6

Following the same procedure as set forth in the preceding examples, 8-day-old broiler cockerels were used to test the efficacy of antibiotic A28695A in controlling coccidiosis in chickens infected with Eimeria acervulina. The results are set forth in Table VI, which follows.

TABLE VI

| Treatment | Diet | Percent Mortality | Weight gain* | Reduction lesion score** |
|---|---|---|---|---|
| | | E. acervulina | | |
| A28695A | .005 | 0 | 99 | 100 |
| | .0025 | 0 | 103 | 100 |
| | .00125 | 0 | 98 | 72 |
| Infected controls | | 0 | 91 | |
| Normal controls | | 0 | 100 | |

*Normal controls taken as 100%.
**Compared with infected controls.

EXAMPLE 7

Following the same procedure set forth in the preceding examples, 8-day-old broiler cockerels were used to determine the efficacy of antibiotic A28695A in controlling coccidiosis in chickens infected with Eimeria maxima.

The results are set forth in Table VII, which follows.

TABLE VII

| Treatment | Diet | Percent Mortality | Weight gain* | Reduction lesion score** |
|---|---|---|---|---|
| | | E. maxima | | |
| A28695A | .005 | 0 | 96 | 100 |
| | .0025 | 0 | 93 | 100 |
| | .00125 | 0 | 92 | 55 |
| Infected controls | | 0 | 64 | |
| Normal controls | | 0 | 100 | |

*Normal controls taken as 100%.
**Compared with infected controls.

EXAMPLE 8

The efficacy of the mixture of antibiotics A28695, as isolated from the fermentation, in controlling coccidiosis in chickens infected with Eimeria tenella was determined by adding the antibiotic to the feed of chickens. The test material is a mixture and is so identified in the table to follow.

The chickens, 8-day-old broiler cockerels, were divided into groups of five birds per cage, two cages per treatment. The birds were fed a standard diet containing antibiotic A28695 uniformly dispersed therein. Forty-eight hours after the medication was commenced, each of the birds was inoculated with sporulated oocysts of E. tenella.

Other groups of five, 8-day-old broiler cockerels were fed the standard diet which did not contain antibiotic A28695. Some of these groups were also inoculated with E. tenella after 48 hours and served as infected controls. Those not infected served as normal controls. The test was terminated seven days after the inoculation period. The birds were weighed, sacrificed and examined for evidence of coccidial lesions. The results were calculated as previously described and are shown in Table VIII which follows.

TABLE VIII

| Treatment | Diet | Percent Mortality | Weight gain* | Reduction lesion score** |
|---|---|---|---|---|
| | | E. tenella | | |
| A28695 (mixture) | .01 | 0 | 106 | 88 |
| | .005 | 0 | 96 | (***) |
| | .0025 | 10 | 85 | (***) |
| Infected controls | | 30 | 49 | |
| Normal controls | | 0 | 100 | |

*Normal controls taken as 100%.
**Compared with infected controls.
***Less than 30%.

EXAMPLE 9

The efficacy of antibiotics A28695 (the mixture), antibiotic A28695A, and antibiotic A28695B, in controlling coccidiosis in chickens infected with Eimeria tenella, was determined by adding the respective antibiotics to the feed of chickens.

The chickens, 8-day-old broiler cockerels, were divided into groups of five birds per cage, three cages per treatment. The birds were fed a standard diet containing antibiotic A28695, antibiotic A28695A, or antibiotic A28695B uniformly dispersed in the diet. Forty-eight hours after the medication was commenced, each of the birds was inoculated with sporulated oocysts of E. tenella.

Other groups of five, 8-day-old broiler cockerels were fed the standard diet which did not contain any of the above-named antibiotics. Some of these groups were also inoculated with E. tenella after 48 hours and served as infected controls. Those not infected served as normal controls. The test was terminated seven days after the inoculation. The birds were weighed, sacrificed and examined for evidence of coccidial lesions. The results were calculated as described previously and are shown in Table IX which follows.

TABLE IX

| Treatment | Diet | Percent Mortality | Weight gain* | Reduction lesion score** |
|---|---|---|---|---|
| | | E. tenella | | |
| A28695 (mixture) | .02 | 0 | 96 | 98 |
| | .015 | 0 | 97 | 75 |
| | .01 | 0 | 93 | 37 |
| | .005 | 6.7 | 68 | (***) |
| A28695A | .015 | 0 | 23 | 100 |
| | .01 | 0 | 49 | 100 |
| | .005 | 0 | 98 | 100 |
| A28695B | .015 | 0 | 103 | 56 |
| | .01 | 0 | 88 | (***) |
| | .005 | 6.7 | 58 | (***) |
| Infected controls | | 13.3 | | |
| Normal controls | | 0 | 100 | |

*Normal controls taken as 100%.
**Compared with infected controls.
***Less than 30%.

EXAMPLE 10

The efficacy of antibiotic A28695A in controlling coccidiosis in rabbits infected with Eimeria stiedae, which affects the liver, and in controlling naturally-occurring intestinal coccidia, was determined by adding the antibiotic to the feed of the rabbits.

The medicated feed for administration to the rabbits was prepared by first preparing a premix. The most concentrated premix contained 1.136 g. of antibiotic A28695A per lb. The antibiotic was blended with solvent-extracted soybean meal by addition of small increments of the antibiotic to the carrier in a large mortar. The antibiotic and the soybean meal were finely ground, blended, and passed through a number 12 screen to produce the final premix. It was utilized to produce a feed containing 0.005 percent antibiotic A28695A.

The second premix contained 0.578 g. of antibiotic A28695A per lb. of premix. It was prepared by blending that weight of A28695A with solvent-extracted soybean meal by addition of small increments of the compound to the carrier in a large mortar. The mixture was finely ground and blended and passed through a number 12 screen for the final product. This premix was utilized to prepare feed containing 0.0025 percent antibiotic A28695A.

In a similar manner, 0.284 g. of antibiotic A28695A was blended with solvent-extracted soybean meal as described above. This premix was utilized to prepare feed containing 0.00125 percent antibiotic A28695A.

These premixes were then individually mixed with Rockland rabbit ration (a standard, commercially available rabbit ration), and the medicated mash thus produced was formed into pellets for feeding to the rabbits.

Susceptible young rabbits, four to eight weeks old, were divided into groups of six rabbits (3 rabbits/cage) per treatment. The rabbits were fed a standard diet containing antibiotic A28695A uniformly dispersed in the diet. Four days after the medication was commenced, each of the rabbits was inoculated orally with sporulated oocysts of *E. stiedae*.

Another group of six of the susceptible rabbits was fed the standard diet which did not contain any of the antibiotic A28695A. This group was also inoculated with *E. stiedae* four days after the medication was commenced, and this group served as the infected control. Other groups of six rabbits each were fed a standard diet containing no antibiotic A28695A, and these rabbits were not inoculated with *E. stiedae*. These groups served as the uninfected (as to *E. stiedae*) controls.

The test was terminated 26 days after the inoculation. These rabbits were weighed, sacrificed, and examined for evidence of coccidial lesions.

During the test, the feces of six rabbits per test group (2 cages of 3 rabbits each) were collected on the day of inoculation and pooled. The feces were then collected twice weekly for 14 days and then daily for 14 days. The feces were examined for the presence of the oocysts of intestinal coccidia as well as of *E. Stiedae*. The intestinal species of coccidia identified by examination of the feces were *E. perforans*, *E. magna*, and *E. Neoleporis*.

At necropsy, the weight of the liver of each rabbit was determined, and the liver weights were calculated as a percentage of total average body weight. Severe infections with *E. stiedae* cause enlargement of the livers. The normal liver is 2–3% of the total body weight.

The rabbits on the highest medication level showed a marked decline in weight which was probably due to failure to eat the medicated pellets. All the rabbits in the control group were severely infected with intestinal coccidia at the start of the test, the infection being natural, not artificial.

Table X, which follows, lists the results of the test. Column 1 lists the percent by weight of antibiotic in the feed; columns 2 through 5, the average gross weights of the rabbits on the designated test days; column 6, the average gross weights of the rabbits at necropsy; column 7, the average liver weight; and column 8, the relation of liver weight to total body weight, expressed as percent.

TABLE X

| Percent A28695A in feed | Average gross wts. of rabbits, g. | | | | Liver data | |
|---|---|---|---|---|---|---|
| | 4* | 11 | 18 | 28 | 30** | Avg. wt., g. | Percent of total rabbit body wt. |
| .005 | 2,052 | 1,887 | 1,814 | 1,828 | 1,699 | 65 | 1.5 |
| .0025 | 2,171 | 2,249 | 2,378 | 2,545 | 2,626 | 91 | 3.5 |
| .00125 | 1,972 | 2,108 | 2,313 | 2,487 | 2,564 | 89 | 3.5 |
| 0 | 2,010 | 2,185 | 2,251 | 2,283 | 2,281 | 184 | 8.1 |

*Day inoculated with *E. Stiedae*.
**Day of necropsy.

Table XI, which follows, sets forth the number of oocysts of intestinal coccidia and of *E. stiedae* found in the feces from the six rabbits per test group on examination on specified days beginning on the day of inoculation and continuing through the day of termination of the test.

The results show antibiotic A28695A to be effective against both the liver form as well as intestinal forms of coccidia.

It should be noted that the infection by the intestinal coccidia was naturally-occurring. It is cyclical and this explains the decrease and disappearance of oocysts of the intestinal coccidia in the feces and then the reappearance of those oocysts at a later date in the feces of the animals which received none of the test compound in their feed. It also explains the variation in the intestinal coccidia oocysts found in the feces of the groups of control animals. These control animals were naturally infected with intestinal coccidia. They were not inoculated with oocysts of *Eimeria stiedae*, but became infected through proximity of cages.

TABLE XI

| Percent antibiotic A28695A | Oocyst passage per test group | |
|---|---|---|
| | Intestinal coccidia | *Eimeria stiedae* |
| Test day No. 4* | | |
| 0.005 | 27,400 | |
| 0.0025 | 1,600 | |
| 0.00125 | | |
| 0 | 11,200 | |
| Control | 7,400 | |
| Do | 13,000 | |
| Test day No. 7 | | |
| 0.005 | 600 | |
| 0.0025 | | |
| 0.00125 | | |
| 0 | 400 | |
| Control | 11,000 | |
| Do | 25,800 | |
| Test day No. 14 | | |
| 0.005 | | |
| 0.0025 | | |
| 0.00125 | | |
| 0 | 3,200 | |
| Control | 17,800 | |
| Do | 400 | |
| Test day No. 18 | | |
| 0.005 | | |
| 0.0025 | | |
| 0.00125 | | |
| 0 | 2,600 | |
| Control | 8,000 | |
| Do | 10,800 | |
| Test day No. 19 | | |
| 0.005 | | |
| 0.0025 | | |
| 0.00125 | | |
| 0 | 600 | |
| Control | 5,800 | 200 |
| Do | 9,000 | 2,200 |
| Test day No. 20 | | |
| 0.005 | | |
| 0.0025 | | |
| 0.00125 | | |
| 0 | 800 | |
| Control | 800 | 200 |
| Do | 600 | 13,400 |
| Test day No. 21 | | |
| 0.005 | | |
| 0.0025 | | |
| 0.00125 | | |
| 0 | 200 | 5,400 |
| Control | 2,000 | 2,400 |
| Do | 400 | 30,000 |
| Test day No. 22 | | |
| 0.005 | | |
| 0.0025 | | |
| 0.00125 | | |
| 0 | | 19,400 |
| Control | 600 | 1,200 |
| Do | 200 | 68,200 |
| Test day No. 23 | | |
| 0.005 | | |
| 0.0025 | | |
| 0.00125 | | |
| 0 | 3,800 | 137,800 |
| Control | 200 | 8,200 |
| Do | | 36,000 |
| Test day No. 24 | | |
| 0.005 | | |
| 0.0025 | | |
| 0.00125 | | |
| 0 | | 280,800 |
| Control | 600 | 7,600 |
| Do | | 34,400 |
| Test day No. 25 | | |
| 0.005 | | |
| 0.0025 | | |
| 0.00125 | | |
| 0 | 3,000 | 1,240,000 |
| Control | 200 | 11,200 |
| Do | | 64,400 |

TABLE XI.—Continued

| Percent antibiotic A28695A | Oocyst passage per test group | |
|---|---|---|
| | Intestinal coccidia | *Eimeria stiedae* |
| Test day No. 26 | | |
| 0.005 | | |
| 0.0025 | | |
| 0.00125 | | |
| 0 | | >1,000,000 |
| Control | | 11,800 |
| Do | 800 | 37,800 |
| Test day No. 27 | | |
| 0.005 | | |
| 0.0025 | | |
| 0.00125 | | |
| 0 | | >1,500,000 |
| Control | 2,600 | 4,800 |
| Do | 200 | 58,400 |
| Test day No. 28 | | |
| 0.005 | | |
| 0.0025 | | |
| 0.00125 | | |
| 0 | | >1,500,000 |
| Control | 3,800 | 5,800 |
| Do | 15,800 | 58,400 |
| Test day No. 29 | | |
| 0.005 | | |
| 0.0025 | | |
| 0.00125 | | |
| 0 | | >1,500,000 |
| Control | 1,600 | 10,800 |
| Do | 13,000 | 41,600 |
| Test day No. 30 | | |
| 0.005 | | |
| 0.0025 | | |
| 0.00125 | | |
| 0 | | >1,000,000 |
| Control | 1,400 | 10,800 |
| Do | 7,000 | 38,000 |

*Day of inoculation.

It will be apparent to those skilled in the art that the anticoccidial agents of this invention may be used either alone or in combination with one or more other anticoccidial agents. That is, poultry can be treated with compositions having antibiotic A28695, A28695A, or A28695B, or one of the salts as the sole anticoccidial agent, or treatment can be initiated wherein one of the antibiotics or one of the salts and one or more other anticoccidial agents are administered concurrently. For such purposes, antibiotic A28695, A28695A, or A28695A can be admixed with one or more other anticoccidial agents including, but not limited to, the following:

3,5-dinitro-*o*-toluamide;
3,5-dichloro-2,5-dimethyl-4-pyridinol;
1,(4-amino-2-*n*-propyl-5-pyrimidinylmethyl-2-picolinium chloride hydrochloride;
ethyl 4-hydroxy-6,7-diisobutoxy-3-quinolinecarboxylate;
7-benzyloxy-6-*n*-butyl-3-methoxycarbonylquinol-4-one;
ethyl 4-hydroxy-6-*n*-decyloxy-7-ethonoxyquinoline-3-carboxylate;
2,4-diamino-5-(3,4-dimethoxybenzyl)-pyrimidine;
2-chloro-4-nitrobenzamide;
sulfaquinoxaline;
other sulfa compounds;
4,4'-dinitrocarbanilide-2-hydroxy-4,6-dimethylpyrimidine complex;
3,3'-dinitrodiphenyldisulfide;
arsanilic acid;
3-amino-4-hydroxyphenylarsonic acid;
5-nitrofurfural semicarbazone, and
the 6,7-dialkoxy-4-hydroxyquinoxaline-3-carboxylic acid esters.

In using combined therapy, therapeutically-effective amounts of antibiotic A28695, A28695A, or A28695B, and another anticoccidial agent are incorporated into the compositions discussed herein above. It is obvious to those skilled in the art that combined therapy may be necessary when various species of the protazoan parasite of the genus *Eimeria* are involved.

We claim:
1. A method of treating and preventing coccidiosis in poultry and rabbits which comprises administering orally to poultry and rabbits an anticoccidially-effective amount of antibiotic selected from the group consisting of A28695, A28695A, A28695B, and the sodium salt, potassium salt, sodium-potassium mixed salt, or ammonium salt thereof.

2. The method of Claim 1 wherein antibiotic A28695 is administered orally to poultry at the rate of from about 0.00125 percent to about 0.03 percent by weight of the daily feed intake.

3. The method of Claim 1 wherein antibiotic A28695 is administered orally to poultry at the rate of from about 0.0025 percent to about 0.02 percent by weight of the daily feed intake.

4. The method of Claim 1 wherein antibiotic A28695A is administered orally to poultry at the rate of from about 0.0025 to about 0.01 percent by weight of the daily feed intake.

5. The method of Claim 1 wherein antibiotic A28695B is administered orally to poultry at the rate of from about 0.015 to about 0.03 percent by weight of the daily feed intake.

6. The method of Claim 1 wherein antibiotic A28695A is administered orally to rabbits at the rate of from about 0.00125 percent to about 0.005 percent by weight of the daily feed intake.

References Cited

Miller, The Pfizer Handbook of Microbial Metabolites, McGraw-Hill Book Co., Inc. New York, N.Y., 1961, pages 573 and 575.

JEROME D. GOLDBERG, Primary Examiner

U.S. Cl. X.R.
424—122